UNITED STATES PATENT OFFICE.

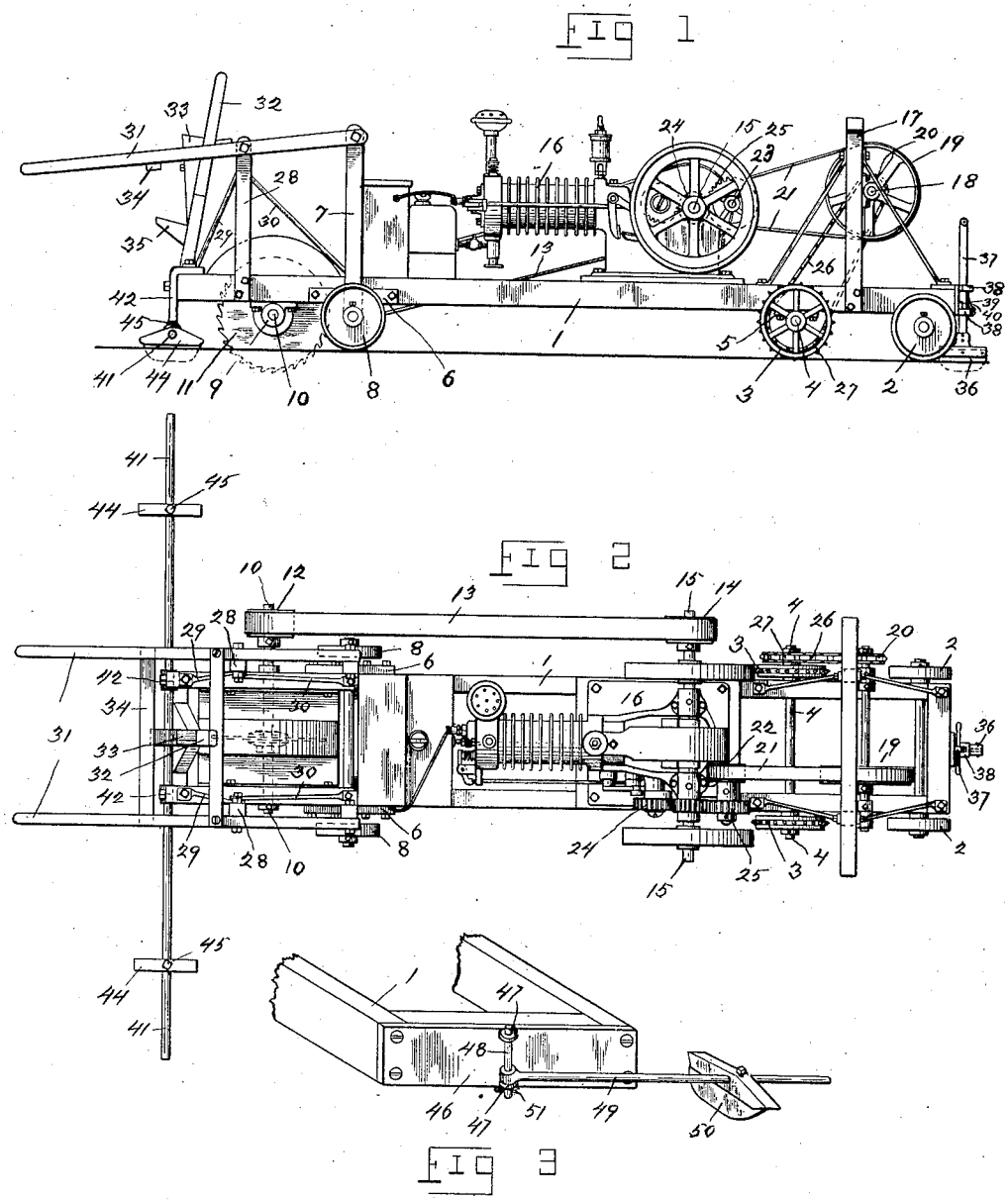

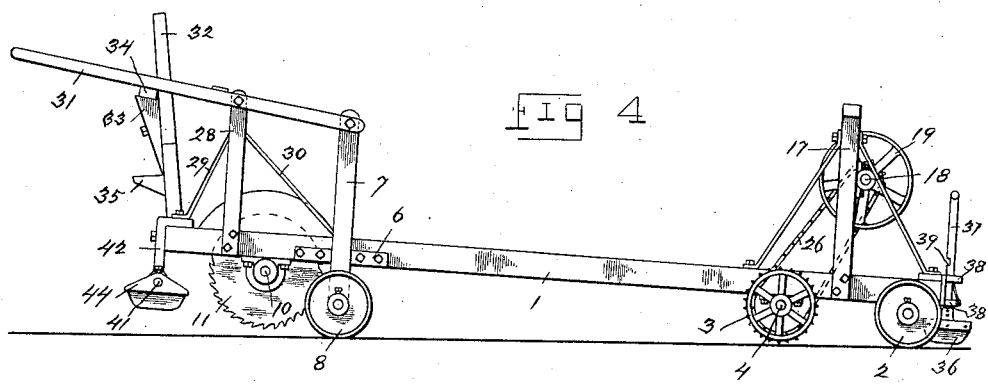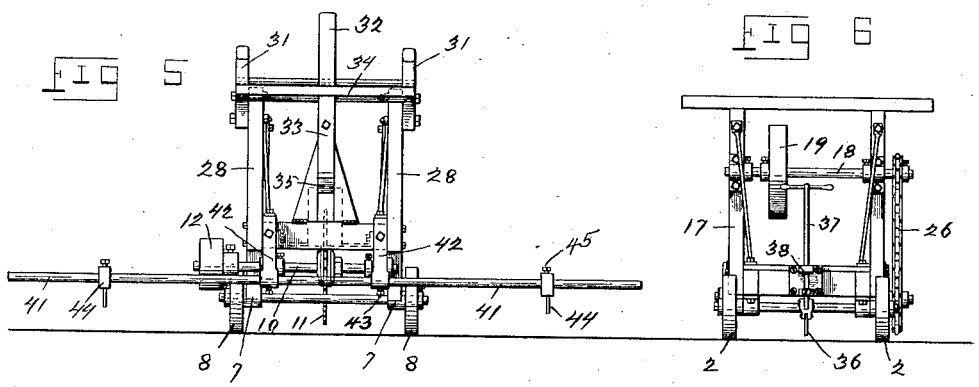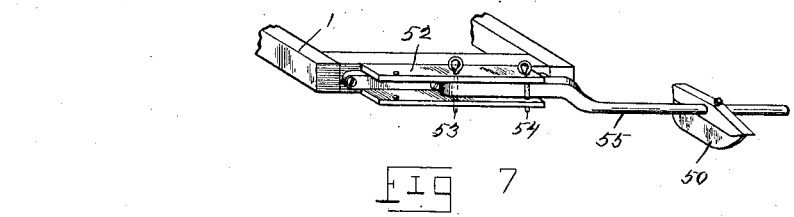

RUFUS A. GAUL, OF EPHRATA, PENNSYLVANIA.

POWER ICE-CUTTING MACHINE.

1,063,527. Specification of Letters Patent. Patented June 3, 1913.

Application filed April 17, 1912. Serial No. 691,492.

*To all whom it may concern:*

Be it known that I, RUFUS A. GAUL, a citizen of the United States, residing at Ephrata, in the county of Lancaster and State of Pennsylvania, have invented certain new and useful Improvements in Power Ice-Cutting Machines, of which the following is a specification, reference being had therein to the accompanying drawing.

This invention relates to a power driven ice cutting machine, such as is employed for harvesting ice on large fields, such as rivers, lakes, and ponds.

The object of the invention is to provide a machine of this class that shall be cheap, durable and efficient, and containing few parts.

Another object of the invention is to construct a device of this class that shall effect the cutting by a rotary saw and in which side swing of the saw is prevented by guide shoes following a previous cut.

Still another object of the invention is to provide means whereby the saw may be raised clear of the ice, and also improved traction means for driving the machine over the ice.

With these and other objects in view, my invention consists in a certain construction and combination of parts as will hereinafter be fully described and claimed in the annexed specification and illustrated in the accompanying drawings, which form a part of this application, and in which like figures of reference refer to corresponding parts in all of the views; but it is fully understood that while I have here described my invention as shown, that I do not confine myself to the exact design, as slight changes may be made in the construction and arrangement of the several parts without departing from the spirit of the invention.

In the drawings: Figure 1, is a side elevation of the device showing the same in a position for cutting. Fig. 2, is a top plan view of the same. Fig. 3, is a detail view of one form of guide shoe and attaching means. Fig. 4, is a side elevation of the machine with the power plant removed and showing the device in an inoperative position. Fig. 5, is a front end elevation of the machine. Fig. 6, is a rear end elevation of the machine. Fig. 7, is a detail view of a modified form of guide shoe and securing means.

Referring to the drawings; the machine comprises a bed or frame 1, rectangular in form, and provided at the rear end with the supporting wheels 2; while adjacent thereto, are mounted the traction or propelling spurred wheels 3, which are secured upon the axle 4, mounted in the journals 5, attached to the frame 1. Near the forward end of the machine are secured a pair of guides 6, within which are slidably mounted the vertical arms 7, upon the lower ends of which are mounted the forward supporting wheels 8, which support the forward end of the frame. Forward of the wheels 8, is rotatably mounted in the bearings 9, secured to the frame 1, the shaft 10, upon which is secured the rotary saw 11, which is operated by a pulley 12, secured upon said shaft 10, and driven by a belt 13, from a pulley 14, on the crank-shaft 15, of the engine 16, which is mounted on the frame 1.

For driving the machine forward, a frame 17, is provided within which is mounted a counter-shaft 18, upon which is secured a pulley 19, and a sprocket 20; the pulley 19, being driven by a belt 21, from a pulley 22, secured upon a shaft 23, mounted upon the engine 16, and driven by the reducing gears 24, and 25, from the engine shaft 15; while the sprocket 20, drives by the chain 26, a sprocket 27, mounted on the axle 4, and hence the traction wheels 3.

For raising the saw 11, clear of the cut and at the same time stopping the forward drive of the machine, there are provided the uprights 28, which are secured to the frame 1, near the forward end thereof, and which are braced by the braces 29, and 30. Upon said uprights 28, are pivoted the operating handles 31, the rear ends of which are pivoted to the upper ends of the vertical arms 7, in such a way that when the forward ends of said handles 31, are raised, the frame 1, will be lifted with respect to the wheels 8, and on the wheels 2, thus raising the saw 11, and the traction wheels 3, clear of the ice, as shown in Fig. 4, for the purpose of stopping the action of the machine and effecting the turning of the same at the end of a cut. The handles 31, may be retained in a raised position by the prop 32, which is hinged to the end of the frame 1, and provided with the lug 33, for engaging the handle brace 34, and the lug 35, by which it may be actuated by the operator's foot.

For preventing any side swing of the machine, I have provided upon the rear end, a guide shoe 36, which follows in the saw cut and which is mounted on the lower end of a rod 37, vertically and movably mounted in the guide ways 38, attached to the frame; said rod 37, being held in either a raised or lowered position by notches 39, adapted to engage the upper guides 38, and held in engagement by the tension spring 40, thus allowing the shoe 36, to be raised clear of the saw cut in the turnings of the machine.

As illustrated in Figs 1, 2, 4, and 5, the forward guide comprises a horizontal rod 41, adjustably mounted in the brackets 42, attached to the frame 1, and held in place by the set screws 43; while upon said rod 41, is adjustably mounted the guide shoes 44, which are held by the set screws 45, in place, and which are intended to run in the last cut made.

As shown in Fig. 3, a modified form of guide is illustrated which comprises a plate 46, secured to the end of the frame; said plate 46, is supplied with the eyes 47, within which is mounted a rod 48, having secured thereto a horizontal arm 49, carrying an adjustable guide shoe 50; said rod 48, being held in place by a pin 51, and the arm 49, bearing against the plate 46, in such a manner that the arm 49, may be swung either to one side or the other as desired. A similar construction is shown in Fig. 7, which comprises a channel member 52, secured to the end of the frame 1, and provided with the vertical pins 53, and 54; said pin 53, securing the end of the arm 55, in a pivoted manner, and said arm 55, being held in either position by the pin 54.

Having thus described my invention what I claim as new and desire to secure by Letters Patent is:—

1. In an ice cutting machine of the class described, the combination with a frame having a motor mounted thereon, and of a rotary ice cutting saw, supporting wheels mounted upon said frame near the rear end thereof, traction wheels mounted adjacent to said supporting wheels, and adapted to be operated by said motor, vertically movable supporting wheels mounted near the forward end of said frame, means for raising the forward portion of said frame with respect to said vertically movable supporting wheels for the purpose of raising the traction wheels and the rotary saw clear of the ice, and guiding means for governing the direction of the travel of said machine.

2. In an ice cutting machine of the class described, the combination with a frame having a motor mounted thereon and provided with a rotary ice cutting saw operated by said motor, of supporting wheels attached to said frame near the ends thereof, the rear pair of said wheels stationary with respect to the frame, means for raising the frame in a vertical manner with respect to the forward pair of said wheels, means for retaining said frame in a raised position, and adjustable means for guiding the travel of said machine.

3. In an ice cutting machine of the class described, the combination with a frame having a motor mounted thereon, a counter-shaft and a rotary ice cutting saw driven by said motor, of traction wheels mounted under said frame near the rear end thereof and driven by said counter-shaft, supporting wheels mounted under said frame near the rear end thereof, means for raising the forward portion of said machine on said rear supporting wheels as a pivot, comprising vertically movable arms mounted upon said frame, supporting wheels carried on the lower ends of said arms, means for raising the frame on said arms, and adjustable guiding means for said machine.

In testimony whereof I affix my signature in presence of two witnesses.

RUFUS A. GAUL.

Witnesses:
JOHN J. THOMPSON,
WM. J. COULTER.

Copies of this patent may be obtained for five cents each, by addressing the "Commissioner of Patents. Washington, D. C."